(12) United States Patent
Ma et al.

(10) Patent No.: US 11,694,447 B2
(45) Date of Patent: *Jul. 4, 2023

(54) CLOSED LANE DETECTION

(71) Applicant: Zoox, Inc., Foster City, CA (US)

(72) Inventors: Derek Xiang Ma, Redwood City, CA (US); Zejia Zheng, San Mateo, CA (US)

(73) Assignee: Zoox, Inc., Foster City, CA (US)

( * ) Notice: Subject to any disclaimer, the term of this patent is extended or adjusted under 35 U.S.C. 154(b) by 26 days.

This patent is subject to a terminal disclaimer.

(21) Appl. No.: 17/408,816

(22) Filed: Aug. 23, 2021

(65) Prior Publication Data

US 2021/0383138 A1 Dec. 9, 2021

Related U.S. Application Data

(63) Continuation of application No. 16/417,441, filed on May 20, 2019, now Pat. No. 11,100,339.

(51) Int. Cl.
*G06V 20/56* (2022.01)
*G06V 20/58* (2022.01)

(52) U.S. Cl.
CPC ............ *G06V 20/588* (2022.01); *G06V 20/58* (2022.01); *G06V 20/582* (2022.01)

(58) Field of Classification Search
CPC ....... H04W 24/02; H04W 8/22; H04W 24/08; H04W 64/00; G06V 20/588; G06V 20/58
See application file for complete search history.

(56) References Cited

U.S. PATENT DOCUMENTS

| 9,213,337 | B1 | 12/2015 | Ferguson | |
|---|---|---|---|---|
| 11,100,339 | B2* | 8/2021 | Ma | G06V 20/588 |
| 2018/0129215 | A1 | 5/2018 | Hazelton et al. | |
| 2020/0372262 | A1 | 11/2020 | Ma et al. | |
| 2022/0326023 | A1* | 10/2022 | Xu | G06N 20/00 |

OTHER PUBLICATIONS

Non Final Office Action dated Oct. 13, 2020 for U.S. Appl. No. 16/417,441, "Closed Lane Detection", Ma, 9 pages.
International Report on Preliminary Patentability for PCT App. No. PCT/US20/33799, dated Dec. 2, 2021, 7 pages.

* cited by examiner

*Primary Examiner* — Diane D Mizrahi
(74) *Attorney, Agent, or Firm* — Lee & Hayes, P.C.

(57) ABSTRACT

Techniques are described for detecting whether a lane of a roadway is open or closed. Detecting a lane as being closed may include detecting an object in or near the lane, which may comprise determining a size, location, and/or classification associated with the object, and dilating the size associated with the object. The lane may be indicated as being closed if a distance between a dilated object detection and another object detection, dilated object detection, or lane extent is less than a threshold distance. The techniques may additionally or alternatively comprise determining an alternative lane shape based at least in part on one or more object detections and/or determining that one or more lanes are closed and/or uploading a lane closure and/or alternative lane shape to a central database for retrieval by/dissemination to other computing devices.

20 Claims, 8 Drawing Sheets

CLOSED LANE DETECTION

RELATED APPLICATION

This is a continuation application which claims priority to commonly assigned, co-pending U.S. patent application Ser. No. 16/417,441, filed May 20, 2019. Application Ser. No. 16/417,441 is fully incorporated herein by reference.

BACKGROUND

Objects, such as traffic cones, pilons, signage, flares, etc. (termed "safety object(s)" herein), may be placed on or near a roadway to indicate that a lane of the roadway is closed. For example, the lane may be closed for construction, a vehicle collision, vehicle repair, or the like. In some instances, object(s) placed on or near the roadway may not completely obstruct the roadway (e.g., a small sign may be placed in the middle of the lane, one or more cones may be placed in the lane). Even without full obstruction of a lane, a human may understand a lane to be completely closed. However, an autonomous vehicle programmed simplistically to avoid collisions with objects may fail to recognize or heed the lane closure and may merely avoid the safety object(s). For example, an autonomous vehicle may enter or merge into a closed lane if a spacing between traffic cones is large enough that the autonomous vehicle could drive through the traffic cones without colliding.

BRIEF DESCRIPTION OF THE DRAWINGS

The detailed description is described with reference to the accompanying figures. In the figures, the left-most digit(s) of a reference number identify the figure in which the reference number first appears. The same reference numbers in different figures indicate similar or identical items.

DETAILED DESCRIPTION

Figure 1:
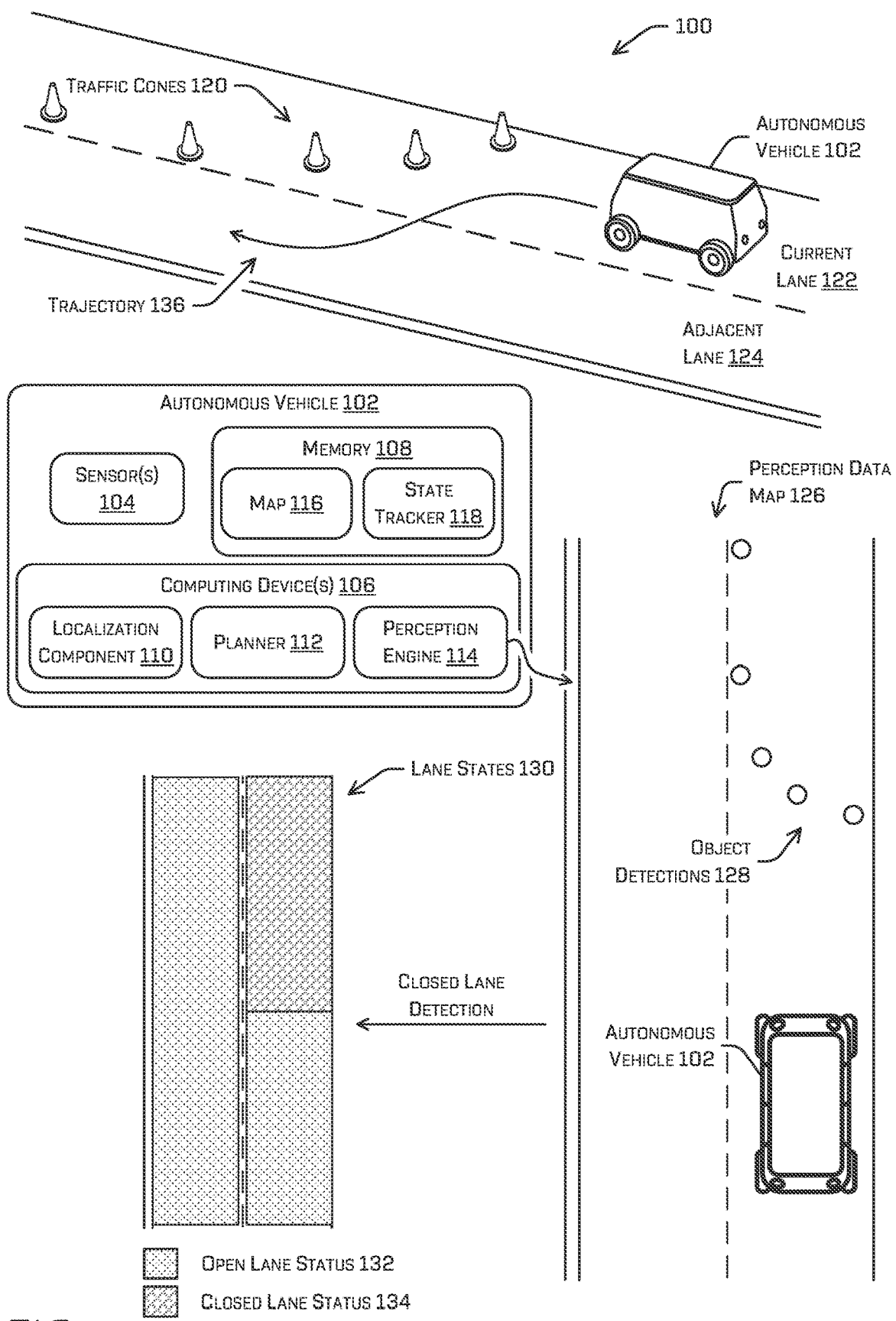
FIG. 1 illustrates an example scenario depicting an autonomous vehicle and a closed lane, where the autonomous vehicle can detect the lane as being closed.

The techniques discussed herein relate to detecting whether a lane of a roadway is open (e.g., available for operating a vehicle) or closed and/or otherwise unavailable. The techniques discussed herein may improve the safety of occupants of an autonomous vehicle that incorporates the techniques discussed herein. Additionally, the techniques may also improve the safety of construction workers, individuals assisting with vehicle repairs, the structural integrity of the autonomous vehicle itself, or the like. Moreover, the techniques may improve the efficiency of an autonomous vehicle in accomplishing a mission such as, for example, delivering passengers and/or cargo, surveying a region, or the like. The techniques may decrease human interventions to provide guidance to an autonomous vehicle that has navigated into a region comprising at least one (partially or fully) closed lane. The techniques may thereby reduce network usage of a network for receiving teleoperations requests from one or more autonomous vehicles of a fleet of autonomous vehicles.

According to the techniques discussed herein, an autonomous vehicle may be configured with a variety of components to detect safety objects and/or signage indicating closure of a lane and to avoid driving in the closed lane. The techniques discussed herein may comprise analyzing one or more lanes of a roadway for closures (e.g., a current lane, one or more adjacent lanes, other lanes). Safety objects may include, for example, traffic cones, pilons, flares, construction/law enforcement/tow/etc. vehicles, construction/law enforcement/tow/etc. workers, etc. and safety signage may include signs indicating a construction zone, roadwork ahead, a lane merge, a specifically colored sign to indicate a deviation from normative road structure (e.g., a red-orange and/or orange sign in the United States), traffic signals (e.g., stop light), flashing lights, and/or the like. In some examples, the autonomous vehicle may receive sensor data from one or more sensors of the autonomous vehicle and determine, based at least in part on the sensor data, an object detection associated with an environment surround the autonomous vehicle.

For example, the autonomous vehicle may determine a region of interest (ROI) (e.g. a bounding box and/or instance segmentation) associated with a portion of the image that is associated with the object, a subset of depth sensor (e.g., lidar, radar, time of flight (ToF), depth camera) points associated with the object, and/or a three-dimensional ROI associated with the object (e.g., a three-dimensional shape associated with the image and/or that bounds the depth sensor points). In some examples, the object detection may indicate a location of the object within the environment surrounding the autonomous vehicle. Additionally or alternatively, the object detection may indicate a size (e.g., in two or more dimensions, e.g., a three-dimensional space), a shape (e.g., a geometric shape, a curve, a boundary, an instance segmentation of sensor data), a classification (e.g., "pedestrian," "vehicle," "construction worker," "construction vehicle," "safety object," "traffic cone," "flare," "safety signage," "roadwork ahead signage," "lane merge signage"), and/or a lane associated with the object (e.g., current lane of autonomous vehicle, adjacent lane to the left, adjacent lane to the right, any other suitable indication identifying a particular lane). In some examples, a lane indication may identify a lane stored in a map that is accessible to the autonomous vehicle (e.g., stored in a memory of the autonomous vehicle, retrievable over a network from a distributed computing system).

The techniques may comprise modifying an object detection, such as by dilating (i.e., increasing) a size indicated by the object detection based at least in part on a scalar. In some examples, the dilation may be based at least in part on a direction associated with the roadway. For example, the autonomous vehicle may determine a tangent associated with a curvature of the roadway and/or the lane. The autonomous vehicle may increase a size associated with the object detection in one or more dimensions associated with the tangent (e.g., the object detection may be extruded along the same direction as the tangent). The size of the object may be increased in any additional or alternate direction (e.g., a direction orthogonal to the tangent or oblique to the tangent).

In some examples, the scalar by which the size is increased may be based at least in part on a width of the roadway or a side thereof (e.g., a side of the roadway associated with a flow of traffic), a width of the lane, a number of lanes of the roadway or a side thereof, a speed at which the autonomous vehicle is moving, a number of open lanes, a number of closed lanes, a classification associated with the object detection (e.g., a scalar associated with a "vehicle" may be less than a scalar associated with a "traffic cone"), and/or a type of closure (e.g., roadway construction; vehicle repair; other construction, e.g., building construction; road cleaning or clearance, e.g., for snow, dirt).

The techniques may additionally or alternatively comprise determining a distance between object detections in the lane being analyzed and/or between an object detection and a lane extent of the lane being analyzed. In some examples, the techniques may comprise determining a distance between an object detection and the nearest of either a lane extent (e.g., a lane edge, such as a roadway edge or a lane marking) or a next object detection. In some examples, a distance may be calculated between each object detection. In such an example, the techniques may comprise determining a maximum distance of two or more distances between object detections and/or lane extents.

If the distance is less than a distance threshold, the techniques may comprise setting a status to indicate that the analyzed lane is closed. In some examples, the status may be a state of a state machine, a flag in a register, and/or any other persistent state. In some examples, the status may be associated with the analyzed lane and/or a portion of the roadway, such as by identifying a portion of a map associated with the status. In some examples, the autonomous vehicle may determine a trajectory for controlling the autonomous vehicle based at least in part on the status. For example, if the status indicates that a current lane in which the vehicle is operating is closed ahead, the autonomous vehicle may change lanes into a lane identified (by the autonomous vehicle) as being open. In some examples, the distance threshold may be based at least in part on a speed of the autonomous vehicle, a width of the lane, a width of the roadway, a classification associated with one or more object detections, and/or a proximity of a pedestrian to safety signage (e.g., which may be indicative of a construction worker holding a construction sign).

If the distance meets or exceeds the distance threshold, the techniques may comprise identifying the lane as being open, although, in additional or alternate examples, the techniques may include determining whether the state currently identifies the lane as being closed and/or whether the sensor data indicates an absence of safety objects. In some examples, if the state identifies the lane as being closed, the techniques may comprise maintaining the state of the lane as being closed. Additionally or alternatively, if the sensor data has indicated an absence of safety objects (e.g., no object detections were generated that have a safety object classification) for a duration and/or a distance of operation that meets or exceeds a threshold time period and/or a threshold distance, then the status may be reverted to an open lane indication. In other words, the autonomous vehicle may maintain the closed lane status, even if a gap opens up that the autonomous vehicle could fit through, until a threshold amount of time or distance has passed since the autonomous vehicle last detected a safety object and/or safety signage. Additionally or alternatively, the autonomous vehicle may revert the state from a closed lane state to an open lane state based at least in part on detecting an affirmative indication that that the lane has re-opened (e.g., "end of roadwork" sign, "slow" sign, green light, light(s) emitting a lighting sequence indicating a re-opened lane and/or a merge, flagger flips sign from "Stop" to "Slow").

In some examples, the techniques may additionally or alternatively fit a shape to the one or more object detections (e.g., a polynomial and/or another curve, a polygon) and/or dilated object detections and associate a status with the shape. For example, the safety objects may designate a new lane that is not associated with traditional lane markings, such as a taper (e.g., merging taper, shifting taper, one-lane two-way traffic taper). The autonomous vehicle may determine a trajectory for controlling the autonomous vehicle based at least in part on the shape.

In some examples, an autonomous vehicle may transmit, to a remote computing device, an indication that a lane of at least a portion of a roadway is closed. The remote computing device may transmit the indication to one or more vehicles of a fleet, thereby updating maps stored thereby to indicate the lane associated with the portion of the roadway is closed. For example, the remote computing device may transmit an instruction to store the lane closed status in association with a portion of a map stored by a vehicle, where the portion of the map is associated with the portion of the roadway.

Example Scenario

FIG. 1 illustrates an example scenario 100 including an autonomous vehicle 102 that may be configured to detect that a lane is closed (unavailable for operation thereon) or open (available for operation thereon). In some instances, the autonomous vehicle 102 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time and/or without needing an operator. However, in other examples, the autonomous vehicle 102 may be a fully or partially autonomous vehicle having any other level or classification. It is contemplated that the techniques discussed herein may apply to more than robotic control, such as for autonomous vehicles. For example, the techniques discussed herein may be applied to air/space/water/subterranean navigation, manufacturing, augmented reality, etc. Moreover, even though the autonomous vehicle 102 is depicted as a land vehicle, autonomous vehicle 102 may be a spacecraft, aircraft, watercraft, subterranean craft, and/or the like.

According to the techniques discussed herein, the autonomous vehicle 102 may receive sensor data from sensor(s) 104 of the autonomous vehicle 102. For example, the sensor(s) 104 may include a location sensor (e.g., a global positioning system (GPS) sensor), an inertia sensor (e.g., an accelerometer sensor, a gyroscope sensor, etc.), a magnetic field sensor (e.g., a compass), a position/velocity/acceleration sensor (e.g., a speedometer, a drive system sensor), a depth position sensor (e.g., a lidar sensor, a radar sensor, a sonar sensor, a time of flight (ToF) camera, a depth camera), an image sensor (e.g., a visible light spectrum camera, a depth camera, an infrared camera), an audio sensor (e.g., a microphone), and/or environmental sensor (e.g., a barometer, a hygrometer, etc.).

The sensor(s) 104 may generate sensor data, which may be received by computing device(s) 106 and/or stored in memory 108 (e.g., in a cache) associated with the vehicle 102. However, in other examples, some or all of the sensor(s) 104 and/or computing device(s) 106 may be separate from and/or disposed remotely from the autonomous vehicle 102 and data capture, processing, commands, and/or controls may be communicated to/from the autonomous vehicle 102 by one or more remote computing devices via wired and/or wireless networks.

In some examples, the computing device(s) 106 may comprise a localization component 110, a planner 112, and/or a perception engine 114. In general, the localization component 110 may determine a location and/or orientation of the autonomous vehicle 102 within a map 116, which may be stored in memory 108; perception engine 114 may determine what is in the environment surrounding the autonomous vehicle 102; and the planner 112 may determine how to operate the autonomous vehicle 102 according to information received from the perception engine 114 regarding the environment.

The map 116 may comprise global map(s), drivable surface map(s), and/or local map(s). A global map may comprise roadways, features (e.g. buildings, business locations, parks), features detectable in different sensor modalities useful for localizing the autonomous vehicle, and/or the like. A drivable surface may map comprise road segments, lanes, traffic signal locations, lane constraints (e.g., turn only, merge, yield), and/or the like. A local map may comprise finer-grained details, which may, in some examples, be based at least in part on sensor data and/or may be generated by an autonomous vehicle. For example, a local map may comprise features of an environment surrounding the autonomous vehicle 102 such as a roadway grade; a fire hydrant, a traffic sign; a traffic light; a tree, a building, permanent seating, a bus stop, locations and/or dimensions of any of the above-mentioned objects, or the like; etc. Determining a location of autonomous vehicle 102 within a global map may comprise determining a location within a roadway at which autonomous vehicle 102 exists (e.g., an identification of a lane of one or more lanes of the roadway and/or a position within that lane). Determining a location of autonomous vehicle 102 within a local map may comprise determining a relative distance of the autonomous vehicle 102 from various features identified in the local map, or as otherwise described in detail herein (for example, with respect to FIG. 5). In some examples, the localization component 110 may output a position of the autonomous vehicle 102 in map 116. In additional or alternate examples, the localization component 110 may determine an orientation (e.g., a yaw, pitch, roll) of the autonomous vehicle 102, which may be relative to an orientation and/or coordinates of a global map and/or a local map.

The perception engine 114 may receive sensor data from sensor(s) 104 and may determine perception data therefrom. For example, perception engine 114 may include one or more machine-learned (ML) models and/or other computer-executable instructions for detecting, identifying, segmenting, classifying, and/or tracking objects from sensor data collected from the environment of the autonomous vehicle 102. In some examples, the perception engine 114 may comprise a component for detecting whether a lane is open or closed.

In the illustrated example scenario 100, autonomous vehicle 102 may receive sensor data from one or more of the sensor(s) 104 as the autonomous vehicle 102 approaches a collection of traffic cones 120. Traffic cones 120 may be one example of safety objects associated with a lane closure. The perception engine 114 may comprise one or more ML models for detecting, based at least in part on the sensor data, object(s) in the environment surrounding the autonomous vehicle 102 and/or classifying the object(s). For example, the autonomous vehicle 102 may receive an image and/or point cloud data (e.g., data from lidar, radar, sonar), which the autonomous vehicle 102 may determine is associated with one or more safety objects (e.g., by determining an object detection is associated with a safety class).

The perception engine 114 may determine a position, orientation, size, shape, and/or track (e.g., a previous, current, and/or predicted position, velocity, and/or acceleration associated with the detected object) associated with an object detected thereby. In some examples, the perception engine 114 may output an object detection associated with an object that identifies a location of the object in map 116, an orientation of the object relative to the autonomous vehicle 102, and/or a volume occupied by the object. For example, perception data map 126 may represent a union of a portion of map 116 and data associated with a collection of object detections 128 output by the perception engine 114 associated with the traffic cones 120.

In some examples, if at least one of the object detections generated by the perception engine 114 indicates a classification associated with a safety object (i.e., a "safety class"), the perception engine 114 may trigger a lane closure analysis. In an additional or alternate example, the autonomous vehicle 102 may analyze at least a current lane 122; any adjacent lane(s), such as adjacent lane 124; and/or any other lane to determine whether the lane is open or closed. For example, the perception engine 114 may continuously or periodically conduct the lane closure analysis described herein, regardless of whether a safety object has been detected, and/or if a safety object is detected the perception engine 114 may trigger a lane analysis in addition to a periodic lane analysis.

In some examples, the perception engine 114 may store and/or maintain a status of one or more lanes of a roadway detected by the perception engine 114 (in some examples the one or more lanes may be indicated by map 116). For example, the perception engine 114 may store a state tracker 118 in memory 108 comprising a state associated with each lane analyzed by the perception engine 114. In some examples, the state may identify whether an analyzed lane is closed or open and/or at least a portion of map 116 with which the state is associated (e.g., a lane identifier). In some examples, the state tracker 118 may additionally or alternatively comprise an indication of whether there is a lane adjacent to a current lane and/or whether an adjacent lane is associated with a same direction of travel or a different direction of travel.

FIG. 1 depicts an example of lane states 130 that may be stored and/or output by the perception engine 114 in association with map 116 and based at least in part on the lane analysis techniques discussed herein. The lane states 130 may comprise an open lane status 132 and a closed lane status 134. The techniques discussed herein may receive object detections output by the perception engine 114 and may determine the lane states 130 based at least in part on the object detections and the techniques discussed herein. For example, the techniques may determine to associate an open lane status 132 with the current lane 122 up until a point associated with a closest object detection, after which the techniques may comprise associating a closed lane status 134 with the current lane 122. The techniques may additionally or alternatively determine that the adjacent lane 124 is associated with a same direction of travel and/or associate an open lane status 132 with the adjacent lane 124. In additional or alternate examples, if a lane is associated with a different direction of travel than the current lane 122, the techniques may comprise associating a closed lane status 134 and/or a different direction of travel status with that lane. Of course, as described in detail herein, such determinations are not limited to predefined (or premapped) lanes, and can extend to alterations of the drivable surface.

Once the perception engine 114 has generated perception data, which may include state(s) identified by a state tracker 118 and/or any other form of indicating a lane closure/opening state, the perception engine 114 may provide the perception data to the planner 112.

The planner 112 may use the perception data, including the lane closed/open states discussed herein, to determine one or more trajectories to control the autonomous vehicle 102 to traverse a path or route and/or otherwise control operation of the autonomous vehicle 102, though any such operation may be performed in various other components. For example, the planner 112 may determine a route for the autonomous vehicle 102 from a first location to a second location; generate, substantially simultaneously, a plurality of potential trajectories for controlling motion of the autonomous vehicle 102 in accordance with a receding horizon technique (e.g., 1 micro-second, half a second, every 10 seconds, and the like) and based at least in part on the lane states 130 (which may be associated with the map 116 and/or state tracker 118) to traverse the route (e.g., in order to avoid any of the detected objects and/or to avoid operating in a closed lane); and select one of the potential trajectories as a trajectory 136 of the autonomous vehicle 102 that may be used to generate a drive control signal that may be transmitted to drive components of the autonomous vehicle 102. FIG. 1 depicts an example of such a trajectory 136, represented as an arrow indicating a heading, velocity, and/or acceleration, although the trajectory itself may comprise instructions for a controller, which may, in turn, actuate a drive system of the autonomous vehicle 102. In the depicted example, planner may generate and/or select trajectory 136 based at least in part on a closed lane status 134 associated with the current lane 122. Trajectory 136 may comprise instructions for actuating a drive system to cause the autonomous vehicle 102 to merge into an adjacent lane 124 (which may be associated with a same direction of travel and an open lane status 132).

Example Process

FIGS. 2A-2E illustrate an example process 200 for analyzing a lane to determine a status of the lane. In some examples, example process 200 may be accomplished by component(s) of perception engine 114. Although the example process 200 is depicted as including a number of operations and/or an apparent flow of operations, example process 200 may include more or less operations, repeat operations, and/or one or more of the operations may be conducted serially, in parallel, and/or in a different order than that shown in the figures.

Figure 2A:
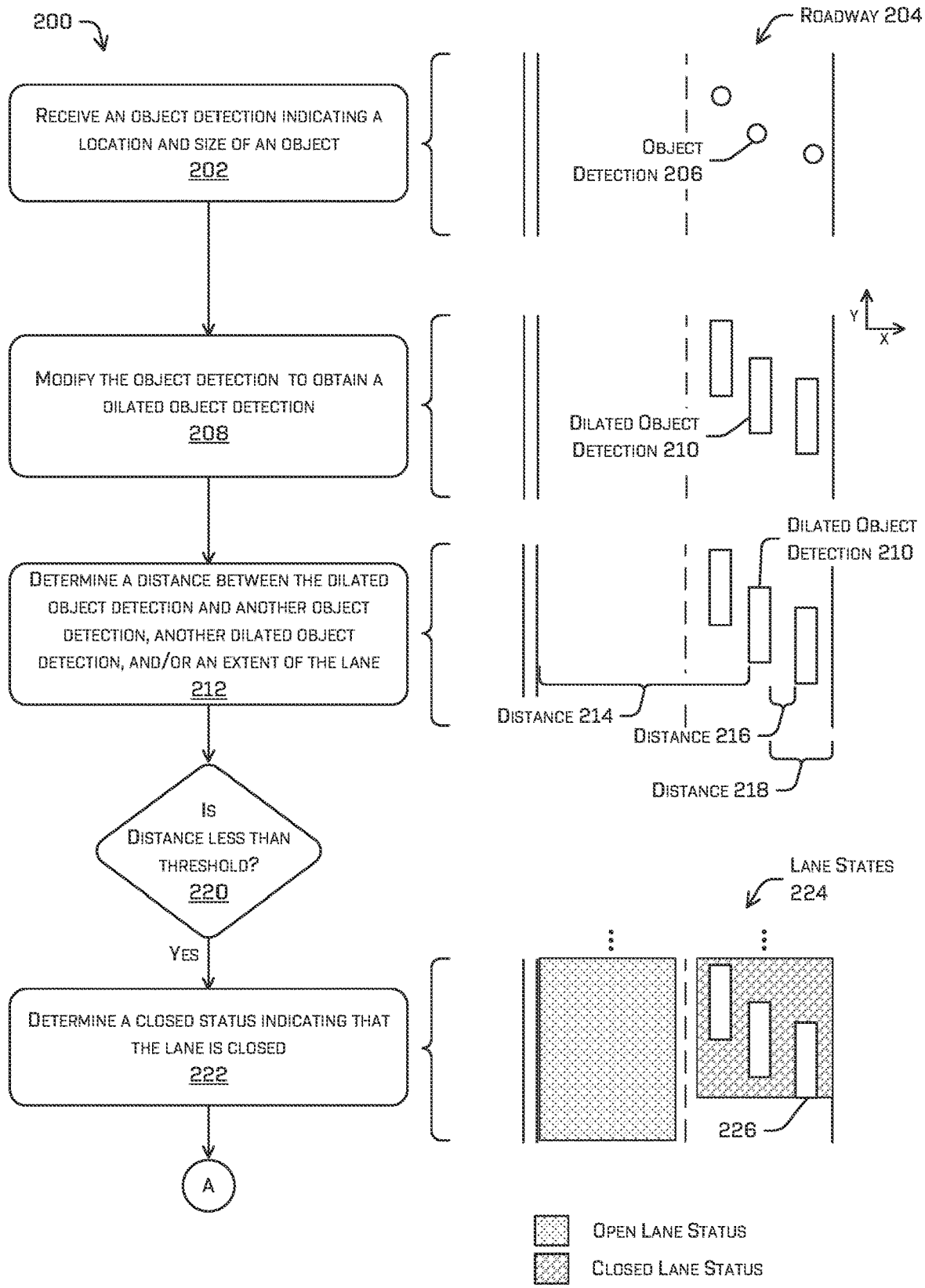
FIGS. 2A-2E illustrate a flow diagram of an example process for detecting a closed lane.

Turning to FIG. 2A, at operation 202, example process 200 may comprise receiving an object detection indicating a location, shape, and/or size of an object in an environment, according to any of the techniques discussed herein. In some examples, the object detection may additionally or alternatively identify a classification associated with the object, a track associated with the object, and/or a lane or other portion of a map associated with the object. In some instances, one or more ML models may output the object detection (e.g., the classification may be machine-learned). In some examples, the object detection may identify a two-dimensional and/or three-dimensional space (e.g., volume, boundaries thereof) associated with the object. FIG. 2A depicts an aerial view of an example roadway 204 comprising two lanes, one lane of which is associated with three object detections representing objects that may have been detected by an autonomous vehicle. For example, object detection 206 may be one of the three object detections.

At operation 208, example process 200 may comprise modifying the object detection, according to any of the techniques discussed herein. In some examples, modifying the object detection may comprise increasing a size ("dilating") associated with the object detection for those objects which correspond to a safety class. The size may be increased according to a scalar. The scalar may be based at least in part on a width of the roadway (e.g., greater width results in greater scaler) or a side thereof (e.g., a side of the roadway associated with a flow of traffic), a width of the lane (e.g., greater width results in greater scalar), a number of lanes of the roadway or a side thereof (e.g., an increased number results in an increased scalar), a speed at which the autonomous vehicle is moving (e.g., a greater speed results in a greater scalar), a number of open lanes (e.g., an increased number of available open lanes results in a greater scalar), a number of closed lanes (e.g., an increased number of closed lanes results in a decreased scaler), a classification associated with the object detection (e.g., a scalar associated with a "vehicle" may be less than a scalar associated with a "traffic cone"), and/or a type of closure (e.g., roadway construction; vehicle repair; other construction, e.g., building construction; road cleaning or clearance, e.g., for snow, dirt—a different base scalar may be associated with any of these). In some instances, operation 208 may comprise increasing the size according to one or more scalars. For example, a scalar may be associated with each dimension associated with the object. Where the object detection defines a shape of the object in Euclidean space, a first scalar may be associated with an x-axis size of the object, a second scalar may be associated with a y-axis size of the object, and a third scalar may be associated with a z-axis size of the object. For examples, the scalar may be a vector having components in each dimension of a space in which the object is defined.

The scalar may additionally or alternatively comprise determining a direction associated with a direction of travel of the lane and/or roadway (e.g., a tangent of the curvature of the lane and/or roadway). In some instances, the size of the object may be increased based at least in part on the direction/tangent. For example, the object may be extruded along the direction and based at least in part on the scalar.

In the depicted example, the example roadway 204 may have a direction parallel to the y-axis. Operation 208 may comprise increasing a size of the object detections primarily along the y-axis based at least in part on the direction of the example roadway 204. Since operation 208 may be based on one or more scalars, the object detections may additionally or alternatively be increased along the x-axis and/or an un-illustrated z-axis (or any other axis in additional or alternate dimension and/or coordinate space, e.g., spherical, cylindrical). For example, dilated object detection 210 is an example of increasing a size of object detection 206 based at least in part on a direction associated with the roadway 204 and/or lane.

At operation 212, example process 200 may comprise determining a distance between a dilated object, another object detection, another dilated object detection, and/or an extent of a lane and/or roadway, according to any of the techniques discussed herein. FIG. 2A depicts examples of distances calculated in an x-axis, although it is understood that distance(s) may be calculated in one or more other dimensions. For example, distance 214 represents a distance from an edge of the dilated object detection 210 to an extent of the roadway. Distance 216 represents a distance from an edge of dilated object detection 210 to another dilated object detection. Distance 218 represents a distance from an edge of the dilated object detection 210 *t* an extent of the lane.

In some examples, operation 212 may additionally or alternatively comprise determining a set of distances between object detections (dilated or not) associated with a lane and/or determining a maximum distance from among the set of distances. For example, in the depicted example, operation 212 may comprise determining a first distance between the broken lane markings to a left-most dilated object detection, a second distance from the left-most dilated object detection to dilated object detection 210, a third distance from dilated object detection 210 to the right-most dilated object detection, and a fourth distance from the right-most dilated object detection to an extent of the lane.

At operation 220, example process 200 may comprise determining whether a distance between a dilated object detection another object detection, another dilated object detection, and/or an extent of a lane and/or roadway meets or exceeds a distance threshold, according to any of the techniques discussed herein. In some examples, the distance threshold may correspond to a width and/or length of the autonomous vehicle (e.g., depending on the dimension in which the distance was measured—in the depicted example, the distance threshold may be based at least in part on a width of the autonomous vehicle) and/or a tolerance. Operation 220 may functionally determine whether the autonomous vehicle would fit between dilated object detections (along a longitudinal or lateral axis of the vehicle, for example). If the distance is less than the distance threshold, example process 200 may continue to operation 222.

At operation 222, example process 200 may comprise determining a closed status indicating that the lane is closed, according to any of the techniques discussed herein. In some examples, operation 222 may comprise any method of setting and/or saving a state in association with the analyzed lane such as, for example, flipping a flag in a register, transitioning a state machine to a state to identify the lane as being closed. For example, FIG. 2A depicts lane states 224, which comprise identifying an analyzed lane as being closed. In some instances, the status may be associated with a portion of a lane based at least in part on a dilated object detection and/or object detection closest to the autonomous vehicle. For example, the closed lane status may be associated with a portion of the lane starting at a closest edge of the closest object detection and/or dilated object corresponding with a closest object (e.g., from the closest edge of the dilated object detection 226 in FIG. 2A). In some examples, example process 200 may continue to operation 228 depicted in FIG. 2B (e.g., as the autonomous vehicle continues to operate, as new sensor data is received).

Figure 2B:
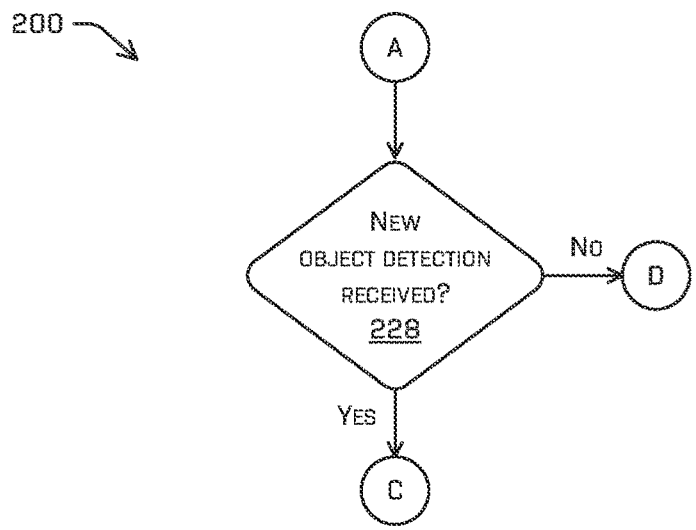

Turning to FIG. 2B, at operation 228, example process 200 may comprise determining if a new object detection has been received, according to any of the techniques discussed herein. In some examples, operation 228 may comprise determining whether a new object detection has been received from a perception engine that identifies a safety class associated with a safety object and/or determining a time period for which no such object detection has been received/generated.

If a new object detection is received, example process 200 may continue to operation 230. If no new object detection is received, example process 200 may continue to operation 232.

Figure 2C:
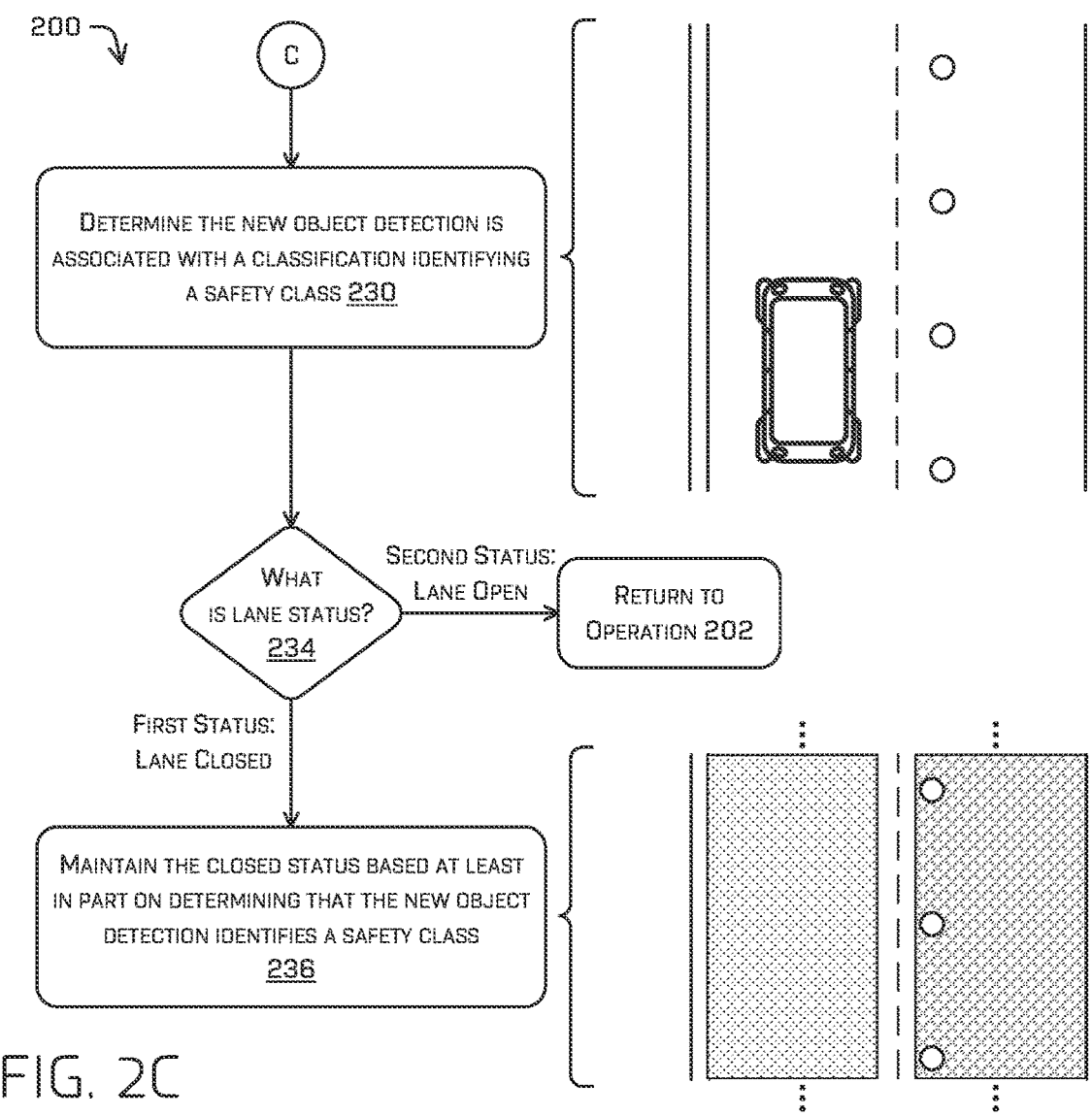

Turning to FIG. 2C, at operation 230, example process 200 may comprise determining whether the new object detection is associated with a safety class identifying a safety object, according to any of the techniques discussed herein. For example, operation 230 may determine whether a classification associated with the new object detection is a label stating "construction vehicle," "traffic cone," "traffic light," and/or the like, as discussed in more detail above. If the new object detection isn't associated with a safety class identifying a safety object, example process 200 may return to operation 226 and/or continue to operation 232. If the object detection is associated with a safety class identifying a safety object, example process 200 may continue to operation 234. For example, this may be relevant where the autonomous vehicle operates next to a lane that contains traffic cones and/or is following a guide construction vehicle.

At operation 234, example process 200 may comprise determining a status associated with a lane with which the new object detection is associated. Operation 234 may comprise checking a status stored in association with the lane. If the status identifies the lane as being open, example process 200 may comprise returning to operation 202. If the status identifies the lane as being closed, example process 200 may comprise continuing to operation 236.

At operation 236, example process 200 may comprise maintaining the closed status of the lane, based at least in part on determining that the new object detection identifies a safety class. For example, operation 236 may ensure that a lane continues to be identified as closed as long as safety object(s) are detected within the lane.

Figure 2D:
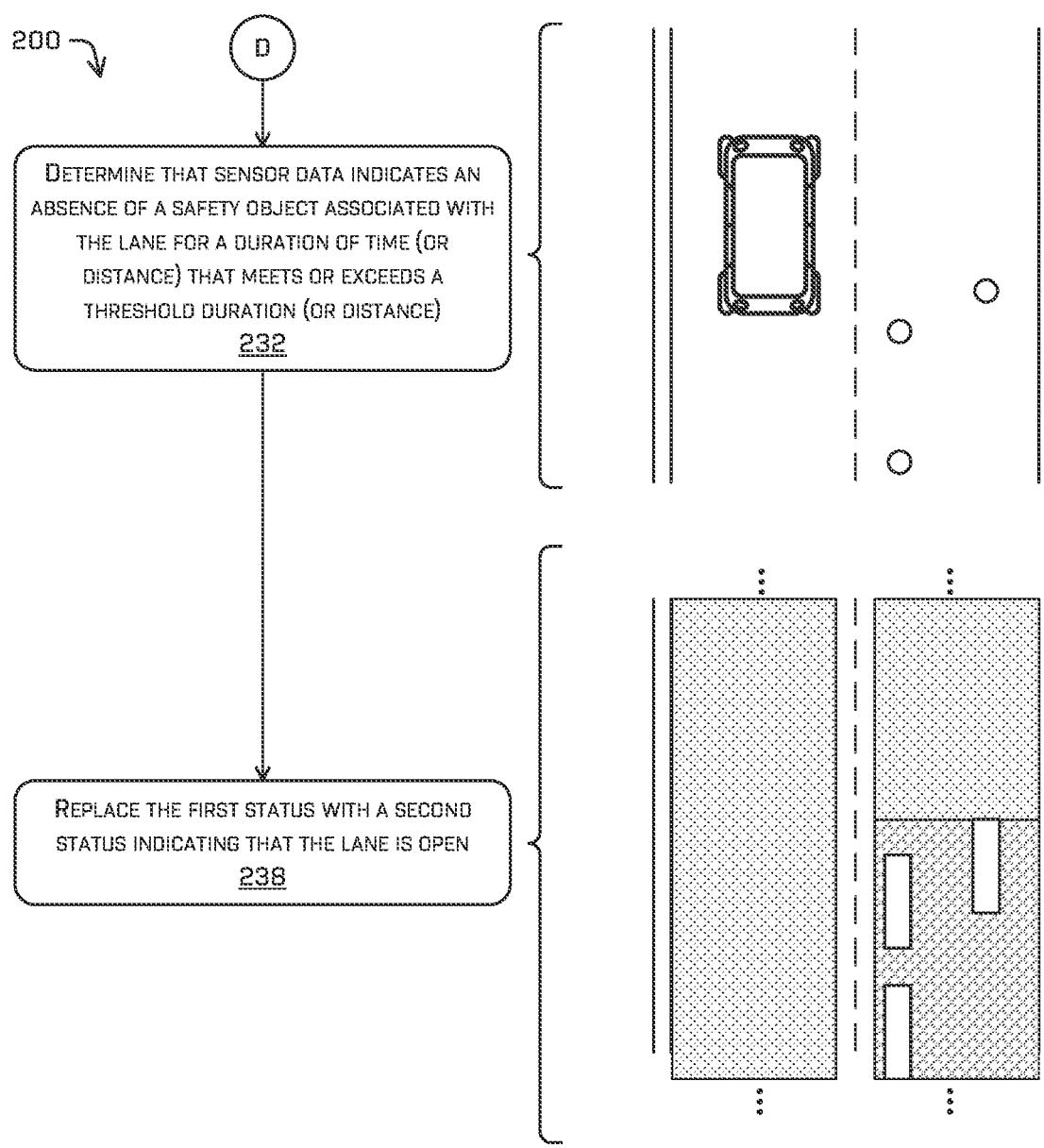

Turning to FIG. 2D, at operation 232, example process 200 may comprise determining that sensor data indicates an absence of a safety object associated with a (closed) lane for a duration of time that meets or exceeds a threshold duration, according to any of the techniques discussed herein. For example, example process 200 may comprise tracking a duration of time that no new object detections are received that identify an object and/or a safety object in a closed lane. That duration of time may be reset any time a new object detection identifies such an object (example process 200 may continue to operation 230 in such an instance). For example, the status associated with a closed lane may thereby be set to an open lane status shortly after an autonomous vehicle clears a last traffic cone, as depicted in FIG. 2D.

Although operation 232 is discussed in regards to a time duration, it is understood that additionally or alternatively operation 232 may be based at least in part on distance traveled by the autonomous vehicle. For example, operation 232 may additionally or alternatively comprise determining that sensor data indicates an absence of a safety object associated with a (closed) lane for a distance traveled by the autonomous vehicle that meets or exceeds a threshold distance. In some examples, the threshold distance and/or the threshold time may be based at least in part on a type of safety object upon which the closed lane status was determined. For example, if the safety object was a "Slow" sign and a flagger, the duration/distance may be larger than if the safety object was a traffic cone.

Once the duration of time meets or exceeds a detection threshold, example process 200 may continue to operation 238.

At operation 238, example process 200 may comprise replacing the first status (a closed lane status) with a second status indicating that the lane is open, according to any of the techniques discussed herein. In some examples, the open lane status may be associated with a portion of the lane corresponding to a furthest edge of a dilated object detection (along a direction/tangent of the roadway) that is furthest from the autonomous vehicle.

Figure 2E:
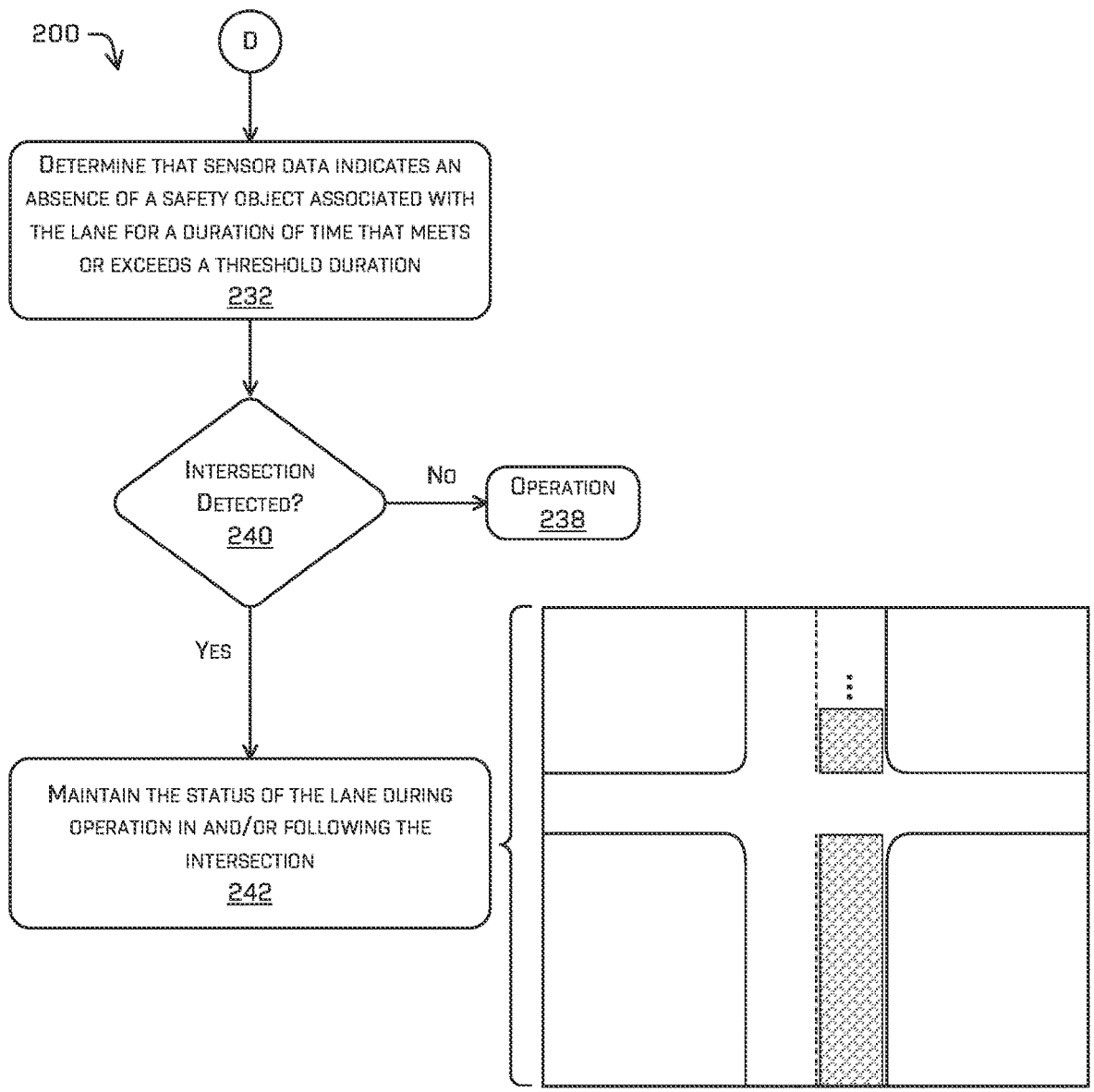

Turning to FIG. 2E, FIG. 2E depicts operations that may replace and/or be added to operations 232 and 238. For example, after operation 232, example process 200 may additionally or alternatively comprise conducting operation 240, according to any of the techniques discussed herein. At operation 240, example process 200 may comprise determining whether the perception engine has detected that the autonomous vehicle is proximate to or within a roadway junction (e.g., an intersection, a "T" junction, any other junction). For example, the autonomous vehicle may be proximate to a junction if the autonomous vehicle is within the threshold distance or threshold duration (of operation 232) of the junction and/or some factor thereof.

If, at operation 240, the perception engine does not determine that the autonomous vehicle is in or proximate to a junction, the example process 200 may continue to operation 238. On the other hand, if, at operation 240, the perception engine determines that the autonomous vehicle is in or proximate to a junction, the example process 200 may continue to operation 242.

At operation 242, example process 200 may comprise maintaining a status associated with the lane while the autonomous is still proximate to and/or in the junction, according to any of the techniques discussed herein. For example, this may comprise maintaining an open or closed status of a lane. This may be useful since the junction may not contain safety objects at all or may not contain safety object at a same rate as previously observed (e.g., traffic cones may be more spaced out to accommodate traffic).

In some examples, example process 200 may additionally or alternatively comprise transmitting a set of states associated with portions of lane(s) and/or roadway(s) to a remote computing device. For example, an autonomous vehicle may transmit a notification that the autonomous vehicle has identified a portion of a lane as being closed upon such a determination and/or the autonomous vehicle may periodically transmit a "heartbeat" signal that includes a current state of the state machine and/or a location of the autonomous vehicle, thereby identifying state(s) of the lane(s) at which the autonomous vehicle is located. In some examples, the remote computing device may store states received from an autonomous vehicle and may transmit updated states to one or more vehicles of a fleet. In some examples, a vehicle of the fleet may be configured to determine a route based at least in part on a state received from the remote computing device. In some examples, an autonomous vehicle may store a lane open/closed state in association with a map so that the state may persist. In some examples, such a persistent state may be associated with an expiration time (e.g., a time from determining the state or receiving the state at which the state will be cleared) or may persist until re-determined or updated (e.g., by receiving a state associated with the lane from another vehicle and/or the remote computing device). In at least some examples, the autonomous vehicle may transmit such information regarding partial or full lane closures to a global map database such that other autonomous vehicles may retrieve data about lane closures. In any such examples, similar steps of expiration time may be implemented and/or be validated/updated based on newly acquired sensor data from the additional vehicles.

In some examples, the lane analysis described above may be conducted to identify a status of a lane up to a range, which may be a distance from the vehicle at which sensor data and/or object detections are determined to be reliable.

Example Lane Modification Scenario and Techniques

Figure 3:
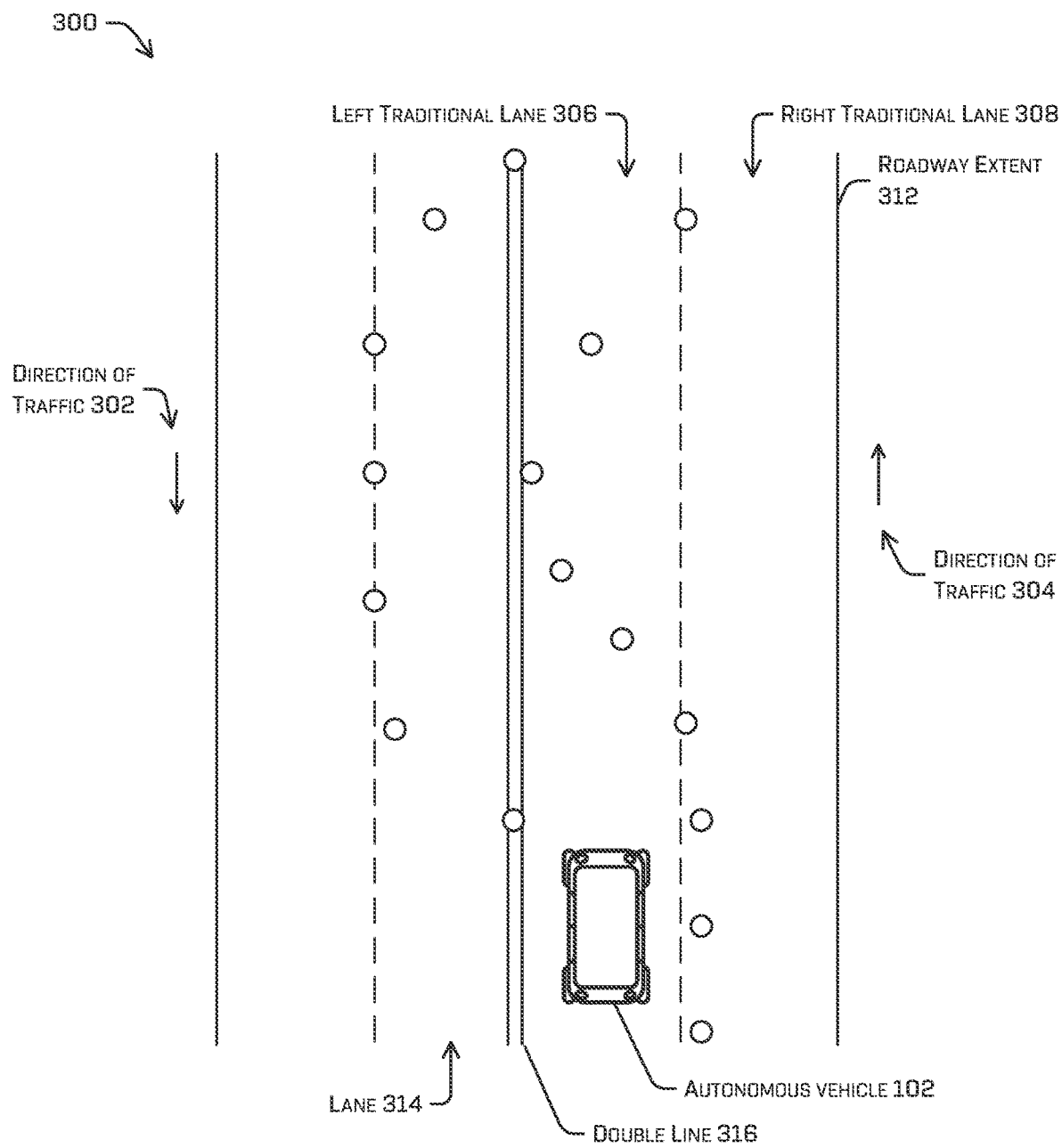
FIG. 3 illustrates an aerial view of a vehicle approaching a shifted taper, which may be an example scenario where the vehicle determines that all lanes of a direction of traffic are closed.

FIG. 3 illustrates an aerial view of an example scenario 300 in which a group of safety objects designate a new lane that is not associated with traditional lane markings. The example scenario 300 in FIG. 3 depicts a shifted taper, although many other lane modifications exist such as, for example, a flagging taper, shoulder taper, merging taper, one-lane two-way traffic taper, and the like. In some examples, the techniques described herein may determine that all available lanes (e.g., lanes associated with a same direction of travel as the vehicle) are closed in a scenario like example scenario 300.

Example scenario 300 includes a roadway having two directions of traffic, direction of traffic 302 and direction of traffic 304, where each direction of traffic has two lanes associated therewith. Direction of traffic 304 includes two traditional lanes (left traditional lane 306 and right traditional lane 308), as demarcated according to the hashed lane markers and bounded by the double (yellow) line 310 and a roadway extent 312. For the sake of example, it is assumed that the autonomous vehicle 102 has already determined that the right traditional lane 308 is closed (e.g., the autonomous vehicle may have stored and/or maintained a closed status in association with the right traditional lane 308) based at least in part on a collection of safety objects in the roadway (e.g., unlabeled due to their number and represented as circles). However, the autonomous vehicle 102, upon coming upon the shifted taper, may determine that the left traditional lane 306 is closed (e.g., due to the safety objects in that lane) and/or that a lane 314 associated with the (opposite) direction of traffic 302 is unavailable since the direction of traffic 302 is opposite direction of traffic 304 with which the autonomous vehicle 102 is associated and/or because of detecting the double line 314. In other words, by applying the techniques discussed in regard to FIG. 2, the autonomous vehicle 102 may determine that all the (traditional) lane(s) associated with a direction of traffic are blocked (e.g., no traditional lane has an opening wide enough for an autonomous vehicle 102 to pass through according to the techniques discussed above in regard to FIG. 2). The autonomous vehicle 102 may be equipped with additional or alternative techniques for determining an alternative lane shape and/or an open/closed status associated therewith. The alternative lane shape may eschew traditional lane markings in some instances.

Figure 4:
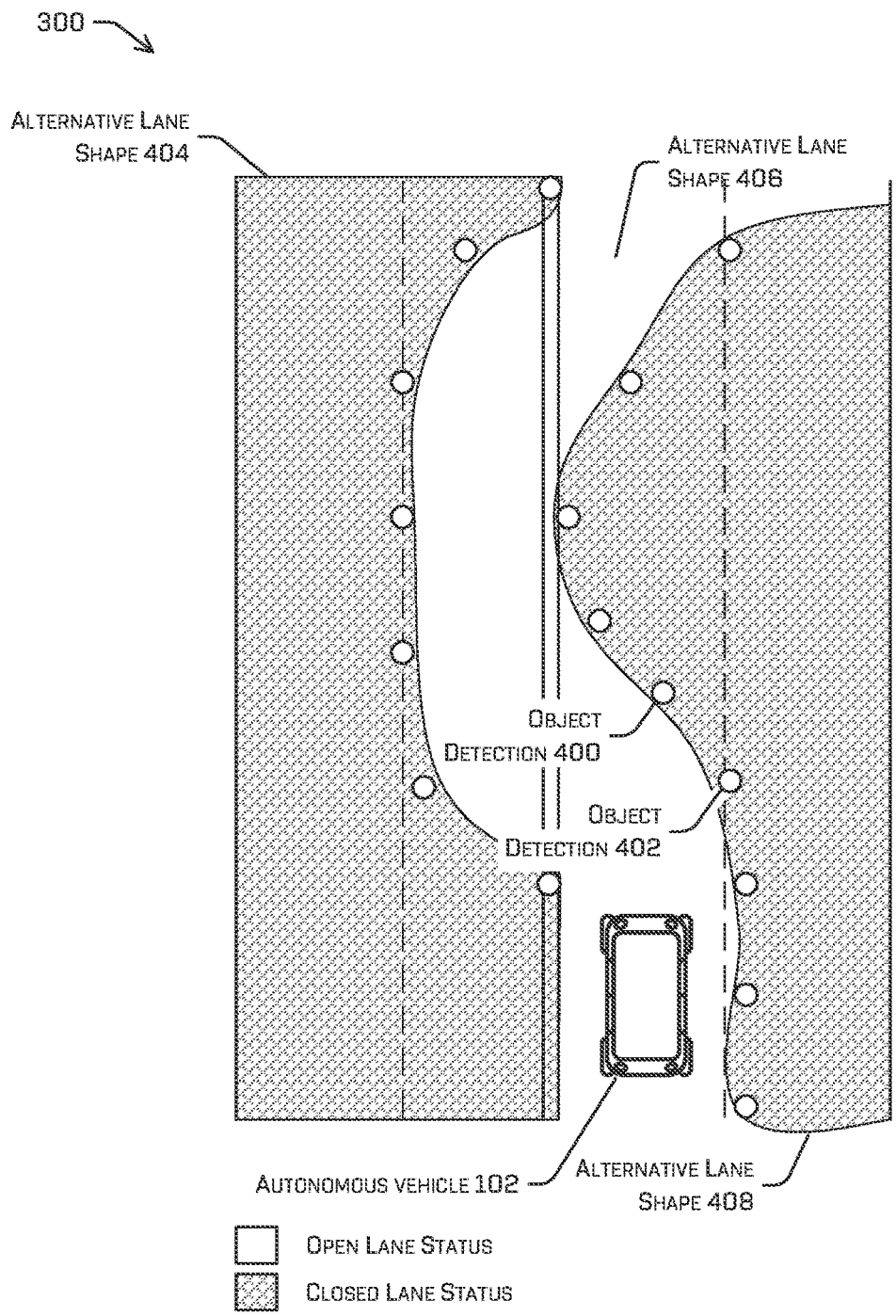
FIG. 4 illustrates an aerial view of one or more alternative lane shapes that the vehicle may determine in association with a closed lane status and/or an open lane status.

FIG. 4 illustrates additional or alternative techniques for determining an open lane status and/or closed lane status associated with portion(s) of a roadway in addition to or instead of in association with traditional lane markings. For example, the techniques discussed herein may attempt to identify an open lane according to the techniques discussed above and according to traditional lane markings. However, if no such lane exists, such as in the example scenario 300, the autonomous vehicle may determine one or more alternative lane shapes and open/closed status(es) associated therewith based at least in part on one or more object detections and/or a state associated with a lane.

For example, the autonomous vehicle may determine that the right traditional lane 308 is associated with a closed status and may determine a shape that overlaps object detections associated with the right traditional lane 308. The autonomous vehicle 102 may additionally or alternatively attempt to extend the shape to include objects within a threshold distance of an object that is in the right traditional lane 308 and continue to do so until no more object detections exist within the threshold distance. For example, object detection 400 may be with a threshold distance of object detection 402, therefore the autonomous vehicle may extend the shape to include object detection 400 and so on (e.g., by connecting a line between the two objects, modifying a boundary to include both objects).

The autonomous vehicle 102 may generate such a shape to have a contiguous boundary and such that there is at least one lane having a minimum width. The minimum width may be a distance that is greater than the threshold distance (so that the shape generated may avoid including safety objects of an opposite side of the tapered lane). In some examples, an ML model may be trained to determine such a shape (e.g., based at least in part on a classification task, clustering task, and/or the like).

In some examples, the autonomous vehicle 102 may repeat this for a second set of safety objects (e.g., the leftward safety objects) associated with a second closed lane status and/or based at least in part on an open lane status. In other words, the autonomous vehicle 102 may inversely determine a shape that positively identifies an open lane, based at least in part on an open lane status and one or more safety objects. In some examples, the autonomous vehicle may detect a safety sign that symbolizes a taper, lane merge, and/or other traffic modification and may determine the alternative lane shape based at least in part on the symbols on the safety sign.

FIG. 4 illustrates three alternative lane shapes, a first alternative lane shape 404 associated with a closed lane status, a second alternative lane shape 406 associated with an open lane status, and a third alternative lane shape 408 associated with a closed lane status. In some examples, the autonomous vehicle 102 may transmit one or more of the alternative lane shapes to a teleoperations system to receive confirmation of the alternative lane shape, a confirmation to cross double line 316, and/or for a teleoperator to provide a modification to the alternative lane shape. In some examples, the alternative lane shape may be stored in a global map database, which may be retrieved by or pushed to (e.g., based on a vehicle that generates a route proximate to a roadway associated with the alternative lane shape) one or more vehicles of a fleet. In some examples, the autonomous vehicle 102 may receive a modification to an alternative lane shape. In some examples, the autonomous vehicle 102 and/or the teleoperations system may use the modification to train an ML model configured to generate the alternative lane shapes. In some instances, a first ML model may be trained to generate alternative lane shapes in association with an open lane status and a second ML model may be trained to generate alternative lane shapes in association with a closed lane status. In an additional or alternate example, a singular ML model may generate alternative lane shapes for both lane statuses. In any such examples, such detections and updates to the drivable lane surfaces may be passed to a global (and/or local) map system such that the autonomous vehicle and/or additional autonomous vehicles may rely on such teleoperator confirmed drivable surfaces. In any such example, the drivable surface and shape may be continuously validated, despite the teleoperation confirmation and pre-mapped data (which may be necessary in the event of any change of such a surface).

Example System

Figure 5:
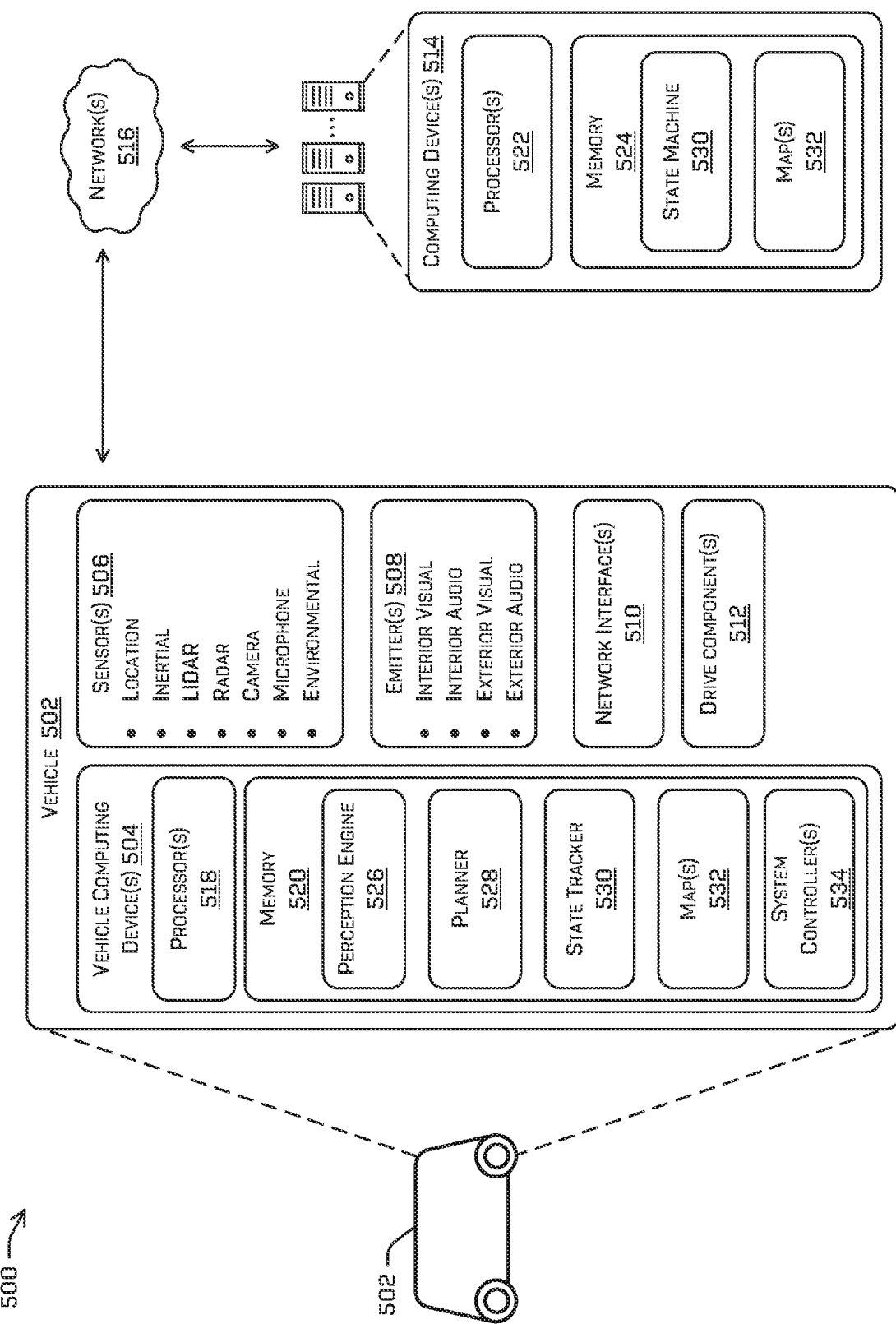
FIG. 5 illustrates a block diagram of an example system for detecting a closed lane and/or determining a alternative lane shape.

FIG. 5 illustrates a block diagram of an example system that implements the techniques discussed herein. In some instances, the system 500 may include a vehicle 502, which may represent the autonomous vehicle 102 in FIG. 1. In some instances, the vehicle 502 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the vehicle 502 may be a fully or partially autonomous vehicle having any other level or classification. Moreover, in some instances, the techniques described herein may be usable by non-autonomous vehicles as well.

The vehicle 502 may include a vehicle computing device(s) 504, sensor(s) 506, emitter(s) 508, network interface(s) 510, and/or drive component(s) 512.

In some instances, the sensor(s) 506 may include lidar sensors, radar sensors, ultrasonic transducers, sonar sensors, location sensors (e.g., global positioning system (GPS), compass), inertial sensors (e.g., inertial measurement units (IMUs), accelerometers, magnetometers, gyroscopes), image sensors (e.g., red-green-blue (RGB), infrared (IR), intensity, depth, time of flight cameras), microphones, wheel encoders, environment sensors (e.g., thermometer, hygrometer, light sensors, pressure sensors), etc. The sensor(s) 506 may include multiple instances of each of these or other types of sensors. For instance, the radar sensors may include individual radar sensors located at the corners, front, back, sides, and/or top of the vehicle 502. As another example, the cameras may include multiple cameras disposed at various locations about the exterior and/or interior of the vehicle 502. The sensor(s) 506 may provide input to the vehicle computing device(s) 504 and/or to computing device(s) 514.

The vehicle 502 may also include emitter(s) 508 for emitting light and/or sound, as described above. The emitter(s) 508 in this example may include interior audio and visual emitter(s) to communicate with passengers of the vehicle 502. By way of example and not limitation, interior emitter(s) may include speakers, lights, signs, display screens, touch screens, haptic emitter(s) (e.g., vibration and/or force feedback), mechanical actuators (e.g., seatbelt tensioners, seat positioners, headrest positioners, etc.), and the like. The emitter(s) 508 in this example may also include exterior emitter(s). By way of example and not limitation, the exterior emitter(s) in this example include lights to signal a direction of travel or other indicator of vehicle action (e.g., indicator lights, signs, light arrays, etc.), and one or more audio emitter(s) (e.g., speakers, speaker arrays, horns, etc.) to audibly communicate with pedestrians or other nearby vehicles, one or more of which comprising acoustic beam steering technology.

The vehicle 502 may also include network interface(s) 510 that enable communication between the vehicle 502 and one or more other local or remote computing device(s). For instance, the network interface(s) 510 may facilitate communication with other local computing device(s) on the vehicle 502 and/or the drive component(s) 512. Also, the network interface (s) 510 may additionally or alternatively allow the vehicle to communicate with other nearby computing device(s) (e.g., other nearby vehicles, traffic signals, etc.). The network interface(s) 510 may additionally or alternatively enable the vehicle 502 to communicate with computing device(s) 514. In some examples, computing device(s) 514 may comprise one or more nodes of a distributed computing system (e.g., a cloud computing architecture). Computing device(s) 514 may be an example of the remote computing device(s) and/or teleoperations system discussed herein.

The network interface(s) 510 may include physical and/or logical interfaces for connecting the vehicle computing device(s) 504 to another computing device or a network, such as network(s) 516. For example, the network interface(s) 510 may enable Wi-Fi-based communication such as via frequencies defined by the IEEE 500.11 standards, short range wireless frequencies such as Bluetooth®, cellular communication (e.g., 2G, 3G, 4G, 4G LTE, 5G, etc.) or any suitable wired or wireless communications protocol that enables the respective computing device to interface with the other computing device(s). In some instances, the vehicle computing device(s) 504 and/or the sensor(s) 506 may send sensor data, via the network(s) 516, to the computing device(s) 514 at a particular frequency, after a lapse of a predetermined period of time, in near real-time, etc.

In some instances, the vehicle 502 may include one or more drive components 512. In some instances, the vehicle 502 may have a single drive component 512. In some instances, the drive component(s) 512 may include one or more sensors to detect conditions of the drive component(s) 512 and/or the surroundings of the vehicle 502. By way of example and not limitation, the sensor(s) of the drive component(s) 512 may include one or more wheel encoders (e.g., rotary encoders) to sense rotation of the wheels of the drive components, inertial sensors (e.g., inertial measurement units, accelerometers, gyroscopes, magnetometers, etc.) to measure orientation and acceleration of the drive component, cameras or other image sensors, ultrasonic sensors to acoustically detect objects in the surroundings of the drive component, lidar sensors, radar sensors, etc. Some sensors, such as the wheel encoders may be unique to the drive component(s) 512. In some cases, the sensor(s) on the drive component(s) 512 may overlap or supplement corresponding systems of the vehicle 502 (e.g., sensor(s) 506).

The drive component(s) 512 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive component(s) 512 may include a drive component controller which may receive and preprocess data from the sensor(s) and to control operation of the various vehicle systems. In some instances, the drive component controller may include one or more processors and memory communicatively coupled with the one or more processors. The memory may store one or more components to perform various functionalities of the drive component(s) 512. Furthermore, the drive component(s) 512 may also include one or more communication connection(s) that enable communication by the respective drive component with one or more other local or remote computing device(s).

The vehicle computing device(s) 504 may include processor(s) 518 and memory 520 communicatively coupled with the one or more processors 518. Computing device(s) 514 may also include processor(s) 522, and/or memory 524. The processor(s) 518 and/or 522 may be any suitable processor capable of executing instructions to process data and perform operations as described herein. By way of example and not limitation, the processor(s) 518 and/or 522 may comprise one or more central processing units (CPUs), graphics processing units (GPUs), integrated circuits (e.g., application-specific integrated circuits (ASICs)), gate arrays (e.g., field-programmable gate arrays (FPGAs)), and/or any other device or portion of a device that processes electronic data to transform that electronic data into other electronic data that may be stored in registers and/or memory.

Memory 520 and/or 524 may be examples of non-transitory computer-readable media. The memory 520 and/or 524 may store an operating system and one or more software applications, instructions, programs, and/or data to implement the methods described herein and the functions attributed to the various systems. In various implementations, the memory may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

In some instances, the memory 520 and/or memory 524 may store a perception engine 526, a planner 528, state tracker 530, map(s) 532, and/or system controller(s) 534. Perception engine 526 may represent perception engine 114, planner 528 may represent planner 112, state tracker 530 may include and/or represent state tracker 118, and/or map(s) 532 may include and/or represent map 116. In some instances, perception engine 526 may comprise a primary perception system, a secondary perception system, a prediction system, and/or a localization system. The memory 520 and/or 524 may additionally or alternatively store localization component, a mapping system, a planning system, a ride management system, etc. Although perception engine 526, planner 528, state tracker 530, and/or map(s) 532 are illustrated as being stored in memory 520, perception engine 526, planner 528, state tracker 530, and/or map(s) 532 may include processor-executable instructions, machine-learned model(s) (e.g., a neural network), and/or hardware and/or may be stored in memory 524.

In some examples, perception engine 526 may comprise one or more ML models for determining an alternative lane shape. Such ML model(s) may comprise a clustering model, a classification model, and/or a regression model. In some examples, the ML model(s) may comprise a neural network. As described herein, an exemplary neural network is a biologically inspired algorithm which passes input data through a series of connected layers to produce an output. Each layer in a neural network can also comprise another neural network, or can comprise any number of layers (whether convolutional or not). As can be understood in the context of this disclosure, a neural network can utilize machine-learning, which can refer to a broad class of such algorithms in which an output is generated based on learned parameters.

Although discussed in the context of neural networks, any type of machine-learning can be used consistent with this disclosure. For example, machine-learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet-50, ResNet-101, VGG, DenseNet, PointNet, and the like.

In some examples, the computing device(s) 514 may generate and/or store state tracker 530 and/or map(s) 532. State tracker 530 may comprise a register, state machine, and/or any other method of persistently and/or temporarily (e.g., for at least a defined (expiration) time) identifying a closed or open state of a lane. For example, the state tracker may comprise a finite state machine ("FSM"), such as a deterministic finite automaton ("DFA"), a data structure, register, and/or the like. In some examples, the state tracker 530 may accumulate, store, and/or otherwise associate a lane status, a lane identifier, a portion of a roadway, a portion of a local map, a portion of a local map, an object detection, a dilated object detection, and/or an alternative lane shape. In an additional or alternate example, the techniques discussed herein may comprise outputting a closed/open status in associated with a current lane and/or any other lane (e.g., an adjacent lane, another lane).

In some examples, map(s) 532 may comprise local, drivable surface, and/or global maps, one or more of which the vehicle 502 may determine based at least in part on sensor data and/or which may be received from computing device(s) 514 over network(s) 516. In some examples, map(s) 532 may comprise a global map database.

Memory 520 may additionally or alternatively store one or more system controller(s) 534, which may be configured to control steering, propulsion, braking, safety, emitters, communication, and other systems of the vehicle 502. These system controller(s) 534 may communicate with and/or control corresponding systems of the drive component(s) 512 and/or other components of the vehicle 502. For example, the planner 528 may generate instructions based at least in part on perception data generated by the perception engine 526 (which may comprise any of the states and/or alternative lane shapes discussed herein) and transmit the instructions to the system controller(s) 534, which may control operation of the vehicle 502 based at least in part on the instructions.

In some examples, computing device(s) 514 may comprise a teleoperations system, which may be configured to generate a presentation of data received from one or more vehicles of a fleet and/or input options to present to a teleoperator to provide guidance to one or more vehicles (e.g., an option to select a displayed button that confirms a trajectory determined by a vehicle, an option for modifying and/or confirming an alternative lane shape determined by a vehicle, an option to confirm crossing a double line).

It should be noted that while FIG. 5 is illustrated as a distributed system, in alternative examples, components of the vehicle 502 may be associated with the computing device(s) 514 and/or components of the computing device(s) 514 may be associated with the vehicle 502. That is, the vehicle 502 may perform one or more of the functions associated with the computing device(s) 514, and vice versa.

Example Clauses

A. A method comprising: receiving, from one or more sensors, sensor data; determining, based at least in part on the sensor data, an object detection, the object detection being associated with a lane of a roadway and indicating a location of an object in an environment and a size of the object in at least a first direction along the lane and a second direction perpendicular to the first direction in a plane associated with the lane; modifying the object detection by increasing the size indicated by the object detection to obtain a dilated object detection; determining a distance between the dilated object detection and at least one of another object detection, another dilated object detection, or an extent of the lane; determining that the distance is less than or equal to a distance threshold; determining, based at least in part on the distance being less than or equal to the distance threshold, a closed status indicating that the lane is closed; and controlling, based at least in part on the closed status, a vehicle.

B. The method of paragraph A, wherein the modifying the object detection comprises increasing the size parallel in the first direction more than in the second direction.

C. The method of either paragraph A or B, wherein: the determining the closed status and the modifying are based at least in part on determining that a classification associated with the object detection identifies a safety class; the safety class comprises at least one of: a safety object; safety personnel; a safety vehicle; or a safety sign or signal.

D. The method of any one of paragraphs A-C, wherein the object detection is a first object detection, and the method further comprises: receiving one or more second object detections after the first object detection; determining at least one of the one or more second object detections is associated with a safety class; and maintaining the closed status based at least in part on the determining at least one of the one or more second object detections is associated with the safety class.

E. The method of any one of paragraphs A-D, further comprising: receiving sensor data after receiving the object detection; determining that the sensor data indicates an absence of a safety object associated with the lane for a distance traveled by the vehicle that meets or exceeds a threshold distance; and replacing the closed status with an open status indicating that the lane as open based at least in part on determining that the sensor data indicates the absence for the distance traveled.

F. The method of any one of paragraphs A-E, further comprising controlling an autonomous vehicle based at least in part on the open status.

G. A system comprising: one or more sensors; one or more processors; and memory storing processor-executable instructions that, when executed by the one or more processors, cause the system to perform operations comprising: receiving an object detection, the object detection indicating a location of an object in an environment and a plurality of dimensions of the object, the plurality of dimensions comprising a first dimension along a direction of a lane associated with the object and a second dimension perpendicular to the first direction; modifying at least one of the first dimension or second dimension based at least in part on at least one of width of the lane or the direction of the lane to obtain a dilated object detection; determining a distance between the dilated object detection and at least one of another object detection, another dilated object detection, or a width of the lane; determining that the distance is less than a distance threshold; and determining, based at least in part on determining that the distance is less than the distance threshold, a closed status indicating that the lane is closed.

H. The system of paragraph G, wherein modifying the at least one of the first direction or the second direction and the determining the closed status are further based at least in part on determining that a classification associated with the object detection comprises a safety class, wherein the safety class comprises at least one of: a safety object; safety personnel; a safety vehicle; or a safety sign or safety signal.

I. The system of either paragraph G or H, wherein the object detection is a first object detection, and the operations further comprise: receiving one or more second object detections after the first object detection; determining at least one of the one or more second object detections is associated with a classification that comprises a safety class; and maintaining the closed status based at least in part on the determining at least one of the one or more second object detections is associated with the classification that identifies the safety object.

J. The system of any one of paragraphs G-I, wherein the operations further comprise: receiving sensor data after receiving the object detection; determining a second object detection associated with at least one of the lane or an adjacent lane; determining that a direction of travel associated with at least one of the lane or an adjacent lane is blocked; and determining, in a plane associated with the roadway, a polygon that includes one or more object detections that identify a safety class.

K. The system of any one of paragraphs G-J, wherein the operations further comprise: determining an open status associated with a second lane, based at least in part on a second object detection or second sensor data associated with the second lane, wherein the second lane is adjacent to the lane.

L. The system of any one of paragraphs G-K, wherein the operations further comprise: receiving, from one or more sensors, sensor data; determining, based at least in part on the sensor data, that the autonomous vehicle is proximate to a junction; and maintaining the closed status based at least in part on determining that the autonomous vehicle is proximate to the junction.

M. The system of any one of paragraphs G-L, wherein the operations further comprise: associating the closed status with at least a portion of a roadway; and transmitting, to a remote computing device, the closed status and an identification of the portion.

N. The system of any one of paragraphs G-M, wherein the operations further comprise: determining, based at least in part on sensor data from a sensor on an autonomous vehicle, a drivable surface on which the autonomous vehicle is travelling comprising at least a lane; receiving, from a remote computing system and based at least in part on the drivable surface, a second status indicating the lane as being closed; and determining a route for controlling an autonomous vehicle based at least in part on the second status and the drivable surface.

O. A non-transitory computer-readable medium storing processor-executable instructions that, when executed by one or more processors, cause the one or more processors to perform operations comprising: receiving an object detection, the object detection comprising a location of an object in an environment and a size of the object; modifying the object detection based at least in part on a direction of a lane associated with the object detection to obtain a dilated object detection; determining a distance between the dilated object detection and at least one of another object detection associated with the lane, another dilated object detection associated with the lane, or an extent of the lane; determining that the distance is less than a distance threshold; and determining, based at least in part on determining that the distance is less than the distance threshold, a closed status indicating that the lane is closed.

P. The non-transitory computer-readable medium of paragraph O, wherein modifying the object detection and determining the closed status are further based at least in part on determining that a classification associated with the object detection comprises a safety class, wherein the safety class comprises at least one of: a safety object; safety personnel; a safety vehicle; or a safety sign or safety signal.

Q. The non-transitory computer-readable medium of either paragraph O or P, wherein the object detection is a first object detection, and the operations further comprise: receiving one or more second object detections after the first object detection; determining at least one of the one or more second object detections is associated with a classification that comprises a safety object; and maintaining the closed status based at least in part on the determining at least one of the one or more second object detections is associated with the classification that identifies the safety object.

R. The non-transitory computer-readable medium of any one of paragraphs O-Q, wherein the operations further comprise: receiving sensor data after receiving the object detection; determining a second object detection associated with at least one of the lane or an adjacent lane; determining that a direction of travel associated with at least one of the lane or an adjacent lane is blocked; and determining, in a plane associated with the roadway, a polygon that includes one or more object detections that identify a safety class.

S. The non-transitory computer-readable medium of any one of paragraphs O-R, wherein the operations further comprise: receiving, from one or more sensors of an autonomous vehicle, sensor data; determining, based at least in part on the sensor data, that the autonomous vehicle is proximate to a junction; and maintaining the closed status based at least in part on determining that the autonomous vehicle is proximate to the junction.

T. The non-transitory computer-readable medium of any one of paragraphs O-S, wherein the operations further comprise: associating the closed status with at least a portion of a roadway; and transmitting, to a remote computing device, the closed status and an identification of the portion.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All of the methods and processes described above may be embodied in, and fully automated via, software code components and/or computer-executable instructions executed by one or more computers or processors, hardware, or some combination thereof. Some or all of the methods may alternatively be embodied in specialized computer hardware.

Conditional language such as, among others, "may," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, "a" means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art.

Many variations and modifications may be made to the above-described examples, the elements of which are to be understood as being among other acceptable examples. All such modifications and variations are intended to be included herein within the scope of this disclosure and protected by the following claims.

What is claimed is:

1. A method comprising:
   receiving sensor data from a sensor;
   determining, based at least in part on the sensor data, an object detection indicating a location of an object in an environment and a size of the object;
   modifying the object detection by increasing the size of the object to obtain a dilated object detection;
   determining a distance between the dilated object detection and another object or drivable area limiting feature;
   determining that the distance is less than or equal to a distance threshold; and
   controlling, based at least in part on the distance being less than or equal to the distance threshold, a vehicle.

2. The method of claim 1, wherein the distance threshold comprises at least one of:
   a length of the vehicle;
   a width of the vehicle; or
   a tolerance.

3. The method of claim 1, wherein the modifying the object detection comprises increasing the size in a first direction more than in a second direction different from the first direction; and
   wherein determining the distance between the dilated object detection and another object or drivable area comprises determining a distance between the dilated object detection and another object, another dilated object, or an extent of a lane.

4. The method of claim 1, wherein:
   the modifying the object detection is further based at least in part on determining that a classification associated with the object detection identifies a safety class comprising at least one of:
   a safety object;
   safety personnel;
   a safety vehicle; or
   a safety sign or signal.

5. The method of claim 1, wherein the object detection is a first object detection, and the method further comprises:
   determining a status associated with a lane;
   receiving a second object detection;
   determining that the second object detection is associated with a safety class; and
   maintaining the status based at least in part on the determining that the second object detection is associated with the safety class.

6. The method of claim 1, further comprising:
   receiving second sensor data after determining the object detection;
   determining that the second sensor data indicates an absence of a safety object associated with a lane for a distance traveled by the vehicle that meets or exceeds a threshold distance; and
   controlling, based at least in part on determining that the sensor data indicates the absence, the vehicle.

7. A system comprising:
   one or more processors; and
   one or more non-transitory computer-readable media storing computer-executable instructions that, when executed, cause the one or more processors to perform operations comprising:
   receiving sensor data from a sensor;
   determining, based at least in part on the sensor data, an object detection indicating a location of an object in an environment and a size of the object;
   modifying the object detection by increasing the size of the object to obtain a dilated object detection;
   determining a distance between the dilated object detection and another object or drivable area limiting feature;
   determining that the distance is less than or equal to a distance threshold; and
   controlling, based at least in part on the distance being less than or equal to the distance threshold, a vehicle.

8. The system of claim 7, wherein the distance threshold comprises at least one of:
   a length of the vehicle;
   a width of the vehicle; or
   a tolerance.

9. The system of claim 7, wherein the modifying the object detection comprises increasing the size in a first direction more than in a second direction different from the first direction.

10. The system of claim 7, wherein determining the distance between the dilated object detection and another object or drivable area comprises determining a distance between the dilated object detection and another object, another dilated object, or an extent of a lane.

11. The system of claim 7, wherein modifying the object detection is further based at least in part on determining that a classification associated with the object detection comprises a safety class comprising at least one of:

a safety object;
safety personnel;
a safety vehicle; or
a safety sign or safety signal.

12. The system of claim 7, wherein the object detection is a first object detection, and the operations further comprise:
receiving a second object detection;
determining that the second object detection is associated with a classification that comprises a safety class; and
controlling, based at least in part on the second object detection being associated with the safety class, the vehicle.

13. The system of claim 7, wherein the operations further comprise:
receiving second sensor data after determining the object detection;
determining, based at least in part on the second sensor data, a second object detection associated with at least one of a lane of a roadway or an adjacent lane;
determining that a direction of travel associated with at least one of the lane or the adjacent lane is blocked; and
determining a polygon associated with the roadway that includes one or more object detections that identify a safety class.

14. The system of claim 7, wherein the operations further comprise:
determining, based at least in part on the object detection or the sensor data, a status associated with a lane;
determining, based at least in part on the sensor data, that the vehicle is proximate to a junction; and
maintaining the status based at least in part on determining that the vehicle is proximate to the junction.

15. The system of claim 7, wherein the operations further comprise:
determining, based at least in part on the sensor data, a drivable surface on which the vehicle is travelling comprising at least a lane;
receiving, from a remote computing system and based at least in part on the drivable surface, a status associated with the lane; and
determining, based at least in part on the status, a route for controlling the vehicle.

16. One or more non-transitory computer-readable media storing instructions executable by one or more processors, wherein the instructions, when executed, cause the one or more processors to perform operations comprising:
receiving sensor data from a sensor;
determining, based at least in part on the sensor data, an object detection indicating a location of an object in an environment and a size of the object;
modifying the object detection by increasing the size of the object to obtain a dilated object detection;
determining a distance between the dilated object detection and another object or drivable area limiting feature;
determining that the distance is less than or equal to a distance threshold; and
controlling, based at least in part on the distance being less than or equal to the distance threshold, a vehicle.

17. The one or more non-transitory computer-readable media of claim 16, wherein the distance threshold comprises at least one of:
a length of the vehicle;
a width of the vehicle; or
a tolerance.

18. The one or more non-transitory computer-readable media of claim 16, wherein modifying the object detection is further based at least in part on determining that a classification associated with the object detection comprises a safety class, wherein the safety class comprises at least one of:
a safety object;
safety personnel;
a safety vehicle; or
a safety sign or safety signal.

19. The non-transitory computer-readable media of claim 16, wherein the operations further comprise:
receiving second sensor data after determining the object detection;
determining, based at least on the second sensor data, a second object detection associated with at least one of a lane of a roadway or an adjacent lane;
determining that a direction of travel associated with at least one of the lane or the adjacent lane is blocked; and
determining a polygon associated with the roadway that includes one or more object detections that identify a safety class.

20. The non-transitory computer-readable media of claim 16, wherein the operations further comprise:
determining, based at least in part on the object detection or the sensor data, a status associated with a lane;
determining, based at least in part on the sensor data, that the vehicle is proximate to a junction; and
maintaining the status based at least in part on determining that the vehicle is proximate to the junction.

* * * * *